United States Patent
Moriya

(10) Patent No.: US 10,805,526 B2
(45) Date of Patent: Oct. 13, 2020

(54) IMAGING APPARATUS, IMAGING METHOD, AND COMPUTER PROGRAM PRODUCT

(71) Applicant: SAMSUNG ELECTRONICS CO., LTD., Suwon-si (KR)

(72) Inventor: Tsuyoshi Moriya, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 2 days.

(21) Appl. No.: 16/218,772

(22) Filed: Dec. 13, 2018

(65) Prior Publication Data

US 2019/0191080 A1    Jun. 20, 2019

(30) Foreign Application Priority Data

Dec. 15, 2017    (JP) ................................ 2017-240130
Oct. 5, 2018    (KR) ........................ 10-2018-0119309

(51) Int. Cl.
    *H04N 5/232*      (2006.01)
    *H04N 5/235*      (2006.01)
    (Continued)

(52) U.S. Cl.
    CPC ....... *H04N 5/23229* (2013.01); *H04N 1/6052* (2013.01); *H04N 5/217* (2013.01);
    (Continued)

(58) Field of Classification Search
None
See application file for complete search history.

(56) References Cited

U.S. PATENT DOCUMENTS

2003/0020814 A1*   1/2003   Ono ................. H04N 5/225
                                                               348/220.1
2006/0056056 A1    3/2006   Ahiska et al.
(Continued)

FOREIGN PATENT DOCUMENTS

JP      H08-126021 A    5/1996
JP      2004-88247 A    3/2004
(Continued)

OTHER PUBLICATIONS

Communication dated Mar. 14, 2019 issued by the International Searching Authority in counterpart Application No. PCT/KR2018/015538 (PCT/ISA/220, PCT/ISA/210, and PCT/ISA/237).
(Continued)

*Primary Examiner* — Quan Pham
(74) *Attorney, Agent, or Firm* — Sughrue Mion, PLLC

(57) ABSTRACT

Provided are an imaging apparatus, an imaging method and a computer program product capable of reducing the deviation of an output image when imaging modules with different spectral sensitivities are replaced with each other, an imaging method, and a computer program product. The imaging apparatus includes a processor that selectively obtains one of the first captured image and the second captured image to be output as an output image based on a magnification characteristic of the output image; based on the first image being replaced with the second image as the output image, corrects image information of the second captured image based on first output image information of the first captured image and second output image information of the second captured image; and outputs the output image according to a correction to the second captured image based on the corrected image information of the second captured image.

22 Claims, 10 Drawing Sheets

(51) Int. Cl.
*H04N 1/60* (2006.01)
*H04N 5/225* (2006.01)
*H04N 9/73* (2006.01)
*H04N 9/04* (2006.01)
*H04N 5/217* (2011.01)

(52) U.S. Cl.
CPC ......... *H04N 5/2258* (2013.01); *H04N 5/2353* (2013.01); *H04N 5/23296* (2013.01); *H04N 5/232411* (2018.08); *H04N 9/04515* (2018.08); *H04N 9/735* (2013.01)

(56) References Cited

U.S. PATENT DOCUMENTS

| | | | |
|---|---|---|---|
| 2008/0122949 A1 | 5/2008 | Kindborg et al. | |
| 2008/0218611 A1 | 9/2008 | Parulski et al. | |
| 2010/0265342 A1* | 10/2010 | Liang | H04N 5/2353 348/208.4 |
| 2013/0300892 A1 | 11/2013 | Nagamasa et al. | |
| 2015/0009358 A1* | 1/2015 | Jung | H04N 9/735 348/223.1 |
| 2016/0182874 A1 | 6/2016 | Richards et al. | |
| 2017/0104980 A1 | 4/2017 | Tran et al. | |
| 2017/0230585 A1 | 8/2017 | Nash et al. | |
| 2017/0257548 A1* | 9/2017 | Tamai | H04N 5/2352 |
| 2017/0272644 A1* | 9/2017 | Chou | H04N 5/2353 |
| 2018/0184010 A1* | 6/2018 | Cohen | H04N 5/23216 |

FOREIGN PATENT DOCUMENTS

| | | |
|---|---|---|
| JP | 2007-235862 A | 9/2007 |
| JP | 2007-318644 A | 12/2007 |
| JP | 2009-65381 A | 3/2009 |
| JP | 2010-130196 A | 6/2010 |
| JP | 2011-30091 A | 2/2011 |
| JP | 2017-156464 A | 9/2017 |
| WO | 2014199338 A2 | 12/2014 |

OTHER PUBLICATIONS

Communication dated Jul. 3, 2020, from the European Patent Office in counterpart European Application No. 18887869.8.

* cited by examiner

IMAGING APPARATUS, IMAGING METHOD, AND COMPUTER PROGRAM PRODUCT

CROSS-REFERENCE TO RELATED APPLICATIONS

This application is based on and claims the benefit of Japanese Patent Application No. 2017-240130, filed on Dec. 15, 2017, in the Japanese Patent Office and Korean Patent Application No. 10-2018-0119309, filed on Oct. 5, 2018, in the Korean Intellectual Property Office, the disclosures of which are incorporated by reference herein in their entireties.

BACKGROUND

1. Field

The disclosure relates to an imaging apparatus, an imaging method, and a recording medium, and more particularly, to an imaging apparatus capable of reducing the deviation of an output image when imaging modules with different spectral sensitivities are replaced with each other, an imaging method, a computer program product and a recording medium.

2. Description of Related Art

Recently, smartphones with two imaging modules with different focal lengths, that is, a wide-angle imaging module and a telephoto imaging module, have been released onto the market. These smartphones enlarge an image captured by a wide-angle imaging module when zooming is performed using a digital zoom, and when an output image reaches a certain magnification, the smartphones replace the output image with an image captured by the telephoto imaging module and output the image. However, since spectral sensitivities of the two imaging modules do not coincide with each other, there is a problem in that the deviation of an image, particularly the deviation of color or brightness, is visible to a user on a preview display screen at the time of replacement of the output image.

SUMMARY

As described above, there is a problem in that the deviation of an output image maybe visible to a user at the time of replacement of an imaging module because an image captured by a wide-angle imaging module and an image captured by a telephoto imaging module are replaced with each other without adjustment of the deviation of color or brightness.

According to an aspect, there is provided an imaging apparatus comprising: a first imaging unit configured to capture a first captured image of a subject; a second imaging unit configured to capture a second captured image of the subject; and at least one processor configured to: selectively obtain one of the first captured image or the second captured image to be output as an output image based on a magnification characteristic of the output image; based on the first captured image being replaced with the second captured image as the output image, correct image information of the second captured image based on first output image information of the first captured image and second output image information of the second captured image; and output the output image according to a correction to the second captured image based on the corrected image information of the second captured image.

The at least one processor maybe further configured to correct the image information of the second captured image based on a determination that a difference between a first value corresponding to the first output image information and a second value corresponding to the second output image information is equal to or less than a certain value.

The first output image information maybe a color balance of the first captured image, and the second output image information maybe a color balance of the second captured image.

The first output image information maybe brightness of the first captured image, and the second output image information maybe brightness of the second captured image.

The at least one processor maybe further configured to divide each of the first captured image and the second captured image into a plurality of blocks and determine the respective image information based on an integrated value or an average value of RGB pixel values included in each of the plurality of blocks.

The first output image information maybe obtained by a first processor, wherein the first imaging unit and the first processor maybe included in a first imaging module, wherein the second output image information maybe obtained by a second processor, wherein the second imaging unit and the second processor maybe included in a second imaging module, wherein the at least one processor maybe further configured to turn off the power of the second imaging module when the first captured image is output as the output image, and turn off the power of the first imaging module when the second captured image is output as the output image.

The imaging apparatus may further comprising: a low-pass filter configured to, when the first captured image is replaced with the second captured image and output, correct the image information of the second captured image based on a determination that an amount of change from the first output image information to the second output image information at a certain time is equal to or less than a certain amount of change.

The first imaging unit and the second imaging unit may have different focal lengths and spectral sensitivities.

The at least one processor maybe further configured to: determine the first output image information based on a first white balance gain obtained from the first captured image and determine the second output image information based on a second white balance gain obtained from the second captured image; determine a third white balance gain by correcting the second white balance gain based on the first output image information and the second output image information; determine a fourth white balance gain, which is a filtered white balance gain, by applying a low-pass filter to the second white balance gain and the third white balance gain; and output the output image based on the fourth white balance gain.

According to another aspect, there is provided an imaging method comprising: capturing a first captured image of a subject by a first imaging unit; capturing a second captured image of a subject by a second imaging unit; selectively obtaining, by at least one processor, one of the first captured image and the second captured image to be output as an output image based on a magnification characteristic of the output image; based on the first captured image being replaced with the second captured image as the output image, correcting image information of the second captured image based on first output image information of the first captured image and second output image information of the second captured image; and outputting the output image according to a correction to the second captured image based on the corrected image information of the second captured image.

The correcting of the image information of the second captured image may comprise: correcting the image information of the second captured image based on a determination that a difference between a first value corresponding to the first output image information and a second value corresponding to the second output image information is equal to or less than a certain value.

The first output image information maybe a color balance of the first captured image, and the second output image information maybe a color balance of the second captured image.

The first output image information maybe brightness of the first captured image, and the second output image information maybe brightness of the second captured image.

The obtaining of the image information may comprise: dividing each of the first captured image and the second captured image into a plurality of blocks and determining the respective image information based on an integrated value or an average value of RGB pixel values included in each of the plurality of blocks.

The imaging method may further comprise: turning off the power of a second imaging module comprising the second imaging unit when the first captured image is output; and turning off the power of a first imaging module comprising the first imaging unit when the second captured image is output.

The correcting of the image information of the second captured image may comprise: performing low-pass filtering on the image information of the second captured image based on a determination that an amount of change from the first output image information to the second output image information at a certain time is equal to or less than a certain amount of change.

The first imaging unit and the second imaging unit may have different focal lengths and spectral sensitivities.

The correcting of the image information of the second captured image may comprise: determining the first output image information based on a first white balance gain obtained from the first captured image; determining the second output image information based on a second white balance gain obtained from the second captured image; determining a third white balance gain by correcting the second white balance gain based on the first output image information and the second output image information; determining a fourth white balance gain, which is a filtered white balance gain, by applying a low-pass filter to the second white balance gain and the third white balance gain; and outputting the output image based on the fourth white balance gain.

According to another aspect, there is provided a computer program product comprising a non-transitory computer-readable recording medium having recorded thereon a program for executing an imaging method, the imaging method comprising: capturing a first captured image of a subject by a first imaging unit; capturing a second captured image of a subject by a second imaging unit; selectively obtaining, by at least one processor, one of the first captured image and the second captured image to be output as an output image based on a magnification characteristic of the output image; based on the first image being replaced with the second image as the output image, correcting image information of the second captured image based on first output image information of the first captured image and second output image information of the second captured image; and outputting the output image according to a correction to the second captured image based on the corrected image information of the second captured image.

The image information of the captured image may comprise a white balance gain or brightness of the captured image, and the obtaining of the image information may comprise: dividing each of the first captured image and the second captured image into a plurality of blocks and determining the respective image information based on an integrated value or an average value of RGB pixel values included in each of the plurality of blocks. wherein the first output image information maybe a color balance or brightness of the first captured image, and the second output image information maybe a color balance or brightness of the second captured image.

According to another aspect, there is provided an imaging apparatus comprising: at least one processor configured to: selectively obtain one of a first captured image from a first imaging unit or a second captured image from a second imaging unit as a captured image; receive an instruction to change a magnification value of the captured image; replace the first captured image with the second captured image based on a determination that the magnification value satisfies a certain criteria; based on the first image being replaced with the second image as the captured image, correct image information of the second captured image based on first output image information of the first captured image and second output image information of the second captured image; and output the captured image according to a correction to the second captured image based on the corrected image information of the second captured image.

The at least one processor maybe further configured to: determine the first output image information based on a first white balance gain obtained from the first captured image and determine the second output image information based on a second white balance gain obtained from the second captured image; determine a third white balance gain by correcting the second white balance gain based on the first output image information and the second output image information; determine a fourth white balance gain, which is a filtered white balance gain, by applying a low-pass filter to the second white balance gain and the third white balance gain; and output the output image based on the fourth white balance gain.

According to another aspect, there is provided an imaging method comprising: selectively obtaining one of a first captured image from a first imaging unit or a second captured image from a second imaging unit as a captured image; receiving an instruction to change a magnification value of the captured image; replacing the first captured image with the second captured image based on a determination that the magnification value satisfies a certain criteria; based on the first image being replaced with the second image as the captured image, correcting image information of the second captured image based on first output image information of the first captured image and second output image information of the second captured image; and outputting the captured image according to a correction to the second captured image based on the corrected image information of the second captured image.

The correcting of the image information of the second captured image may comprise: determining the first output image information based on a first white balance gain obtained from the first captured image; determining the second output image information based on a second white balance gain obtained from the second captured image; determining a third white balance gain by correcting the second white balance gain based on the first output image information and the second output image information; determining a fourth white balance gain, which is a filtered white balance gain, by applying a low-pass filter to the second white balance gain and the third white balance gain; and outputting the output image based on the fourth white balance gain.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
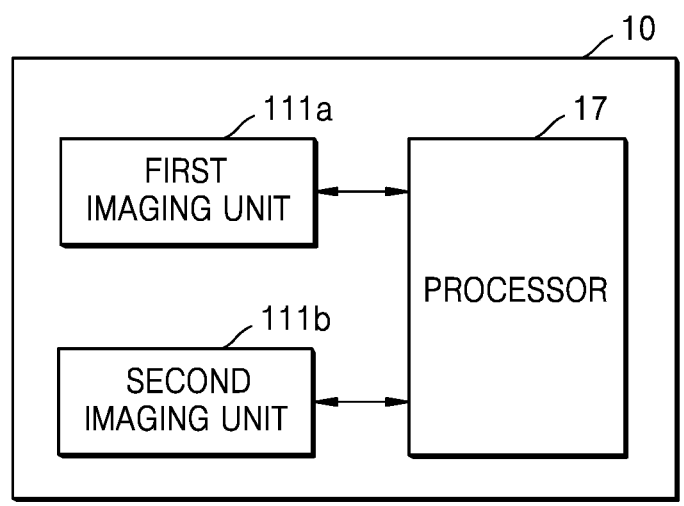
FIGS. 1A to 1C are block diagrams of an imaging apparatus according to an embodiment.

Reference will now be made in detail to one or more embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the one or more embodiments are merely described below, by referring to the figures, to explain aspects. Expressions such as "at least one of," when preceding a list of elements, modify the entire list of elements and do not modify the individual elements of the list.

Figure 1B:
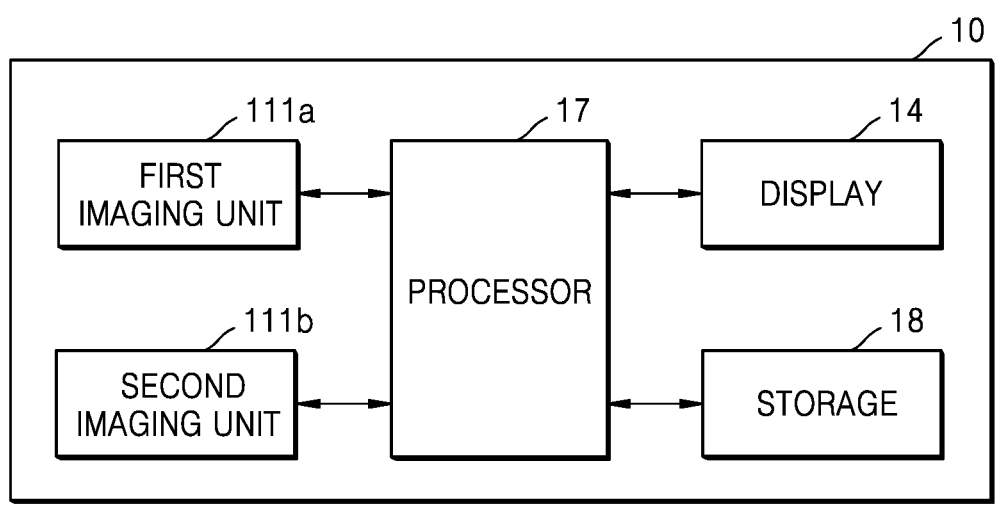
Figure 1C:
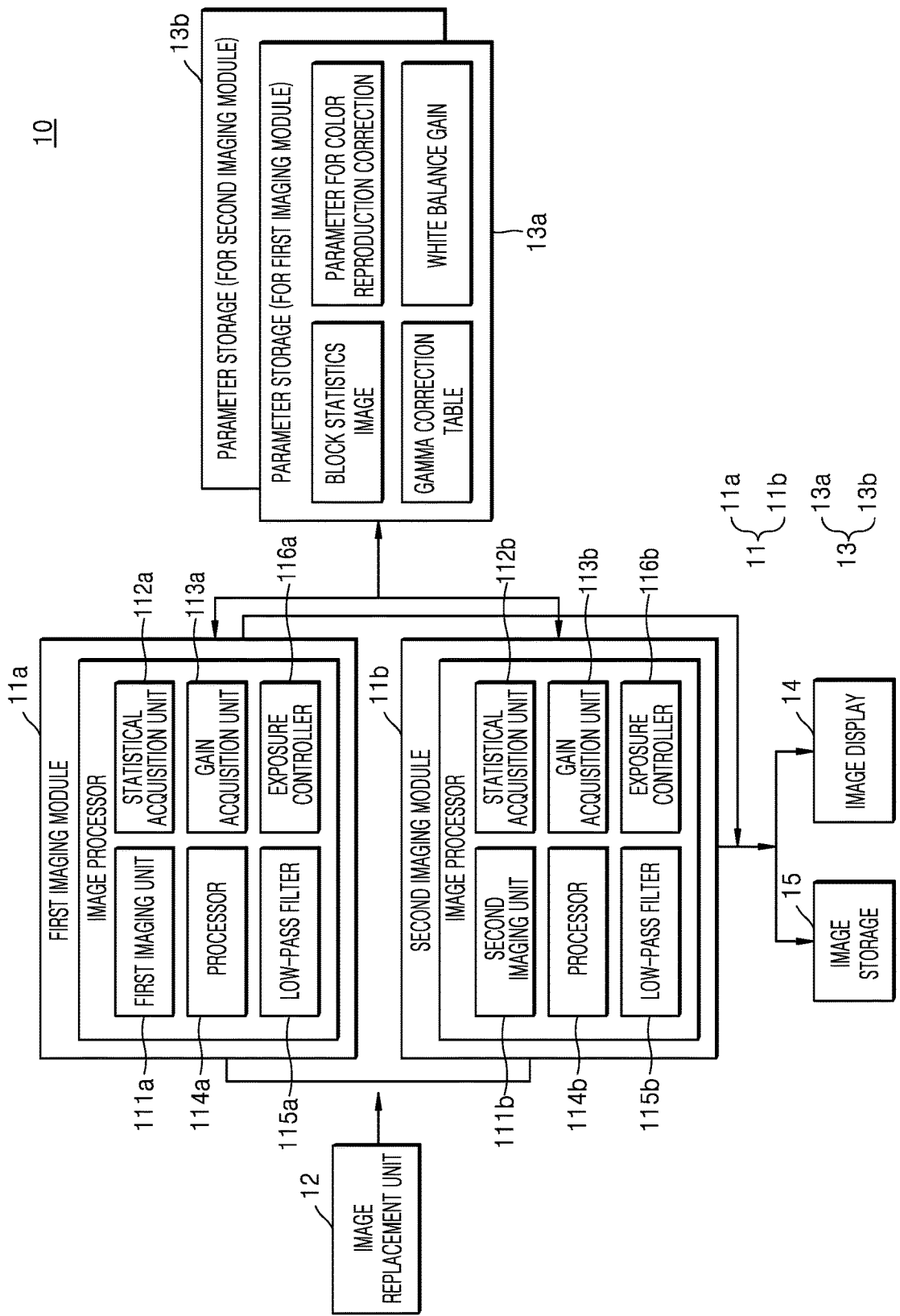

FIGS. 1A to 1C are block diagrams of an imaging apparatus according to an embodiment.

In FIGS. 1A to 1C, the number of imaging modules is limited to two in order to simplify the explanation, but the embodiment is not limited thereto and may include two or more imaging modules.

As shown in FIG. 1A, an imaging apparatus 10 may include a first imaging unit 111a, a second imaging unit 111b, and a processor 17. However, the imaging apparatus 10 may be implemented by a larger number of components than components shown in FIG. 1A. For example, as shown in FIG. 1B, the imaging apparatus 10 according to an embodiment may further include a storage 18 and a display 14.

Although FIGS. 1A and 1B show that the imaging apparatus 10 includes one processor 17, the embodiment is not limited thereto. The imaging apparatus 10 may include a plurality of processors. When the imaging apparatus 10 includes a plurality of processors, some or all of operations and functions of the processor 17 described later below may be performed by the plurality of processors.

The imaging apparatus 10 may include a plurality of imaging units including the first imaging unit 111a and the second imaging unit 111b. Focal lengths and spectral sensitivities of the first imaging unit 111a and the second imaging unit 111b may have different focal lengths and spectral sensitivities.

For example, the first imaging unit 111a may be a wide-angle imaging module including a wide-angle lens, and the second imaging unit 111b may be a telephoto imaging module including a telephoto lens. Therefore, the first imaging unit 111a and the second imaging unit 111b may have different spectral sensitivities. In addition, the focal length of the first imaging unit 111a may be shorter than the focal length of the second imaging unit 111b.

According to an embodiment, the first imaging unit 111a and the second imaging unit 111b may include one or more image capturing components configured to capture an image. According to another embodiment, the first imaging unit 111a and the second imaging unit 111b may include imaging sensors configured to capture an image.

The imaging apparatus 10 may capture a subject using the first imaging unit 111a for wide-angle imaging when a zoom magnification is equal to or greater than 1.0× and is equal to or less than 2.0× (i.e., between 1.0 times the original capture and 2.0 times the original capture inclusive). Further, when the zoom magnification is greater than 2.0× times and equal to or less than 4.0× (i.e., between 2.1 times the original capture and 4.0 times the original capture inclusive), the imaging apparatus 10 captures the subject using the second imaging unit 111b for telephoto imaging. In the imaging apparatus 10 according to the embodiment, the subject is captured by appropriately dividing the wide-angle lens (the first imaging unit 111a) and the telephoto lens (the second imaging unit 111b) according to the zoom magnification. The zoom magnification may be operated by the user.

The processor 17 may replace a first captured image captured by the first imaging unit 111a with a second captured image captured by the second imaging unit 111b by the zoom magnification operated by a user and may output the replaced image as an output image. When the processor 17 replaces the first captured image captured by the first imaging unit 111a with the second captured image captured by the second imaging unit 111b and outputs the second captured image, the processor 17 may control replacement of the first capture image with the second captured image such that a difference between first output image information of the first captured image and second output image information of the second captured image captured image information is equal to or less than a certain value. The processor 17 acquires image information of a captured image captured by each of the plurality of first and second imaging units 111a and 111b and corrects an output image based on the image information such that the difference between the first output image information and the second output image information is equal to or less than a certain value when the captured image is replaced.

For example, the image information may include at least one of a white balance gain and a brightness of the captured image. For example, output image information may include at least one of a color balance and the brightness of the captured image.

When the processor 17 replaces the first captured image captured by the first imaging unit 111a with the second captured image captured by the second imaging unit 111b and outputs the second captured image, the processor 17 may correct image information of the second captured image based on the first output image information of the first captured image and the second output image information of the second captured image. When the processor 17 replaces the first captured image with the second captured image and outputs the second captured image, the processor 17 may correct the image information of the second captured image such that the difference between the first output image information and the second output image information is equal to or less than a certain value. The processor 17 outputs the second captured image by applying the corrected image information, thereby reducing the deviation when the captured image is switched.

The storage 18 may store information including a parameter for a block statistics image (block statistics S), a white balance gain $W_g$, and color reproduction correction and a parameter for image signal processing such as a gamma correction table. The storage 18 may also store the captured image captured by the first imaging unit 111a or the second imaging unit 111b.

When the first imaging unit 111a is completely replaced by the second imaging unit 111b and the second imaging unit 111b is activated, the processor 17 may refer to a correction parameter of the first imaging unit 111a stored in the storage 18 before actively replacing the first imaging unit 111a with the second imaging unit 11b. When the first imaging unit 111a is replaced by the second imaging unit 111b, the processor 17 may process such that a color of the output image (second captured image) after replacement approximates a color of the output image (first captured image) before replacement based on the correction parameter.

The image display 14 may display the captured image captured by either the first imaging unit 111a or the second imaging unit 111b, which is activated with the captured image being actively converted, as an output image.

FIG. 1C shows a specific block diagram of the imaging apparatus 10 according to the embodiment.

The processor 17 of FIGS. 1A and 1B may correspond to the image processor of the first imaging module 11a and the image processor of the second imaging module 11b. The image processor of the first imaging module 11a and the image processor of the second imaging module 11b may include statistical acquisition units 112a and 112b, gain acquisition units 113a and 113b, processors 114a and 114b, low-pass filters 115a and 115b, exposure controllers 116a and 116b, and an image replacement unit 12 of FIG. 1C. Accordingly, the processor 17 of FIGS. 1A and 1B may include at least one of the statistical acquisition units 112a and 112b, the gain acquisition units 113a and 113b, the processors 114a and 114b, the low-pass filters 115a and 115b, the exposure controllers 116a and 116b, and the image replacement unit 12 of FIG. 1B, according to an embodiment. According to another embodiment, the processor 17 of FIGS. 1A and 1B may be configured to perform one or more operations of a corresponding configuration of the statistical acquisition units 112a and 112b, the gain acquisition units 113a and 113b, the processors 114a and 114b, the low-pass filters 115a and 115b, the exposure controllers 116a and 116b, and the image replacement unit 12. Thus, the above description with respect to the processor 17 may be applied to the operations of the corresponding configuration.

The storage 18 of FIG. 1B may correspond to the parameter storages 13a and 13b and an image storage 15 of FIG. 1C. Therefore, the storage 18 of FIG. 1B may include at least one of the parameter storage 13a and the parameter storage 13b and the image storage 15 of FIG. 1C, or may perform the operations of the configuration. Thus, the above description with respect to the storage 18 may be applied to the operations of the corresponding configuration.

As shown in FIG. 1C, the imaging apparatus 10 may include an imaging module 11, the image replacement unit 12, a parameter storage 13, an image display 14, and the image storage 15.

The imaging module 11 may include a first imaging module 11a and a second imaging module 11b.

The first imaging module 11a may include a first imaging unit 111a, a statistics acquisition unit 112a, a gain acquisition unit 113a, a processor 114a, a low-pass filter 115a, and an exposure controller 116a. The second imaging module 11b may include a second imaging unit 111b, a statistics acquisition unit 112b, a gain acquisition unit 113b, a processor 114b, a low-pass filter 115b, and an exposure controller 116b.

The first imaging module 11a may include the first imaging unit 111a realized by hardware such as a lens, an iris, and a shutter or a signal processing circuit for processing signals of a captured image captured by the first imaging unit 111a. According to an embodiment, the first imaging unit 111a and the second imaging unit 111b may include one or more image capturing components configured to capture an image. According to another embodiment, the first imaging unit 111a and the second imaging unit 111b may include imaging sensors configured to capture an image. A configuration of the second imaging module 11b may also be same as that of the first imaging module 11a.

For example, the first imaging module 11a is a wide-angle imaging module and the second imaging module 11b is a telephoto imaging module. Therefore, the first imaging unit 111a and the second imaging unit 111b may have different spectral sensitivities. Furthermore, a focal length of the first imaging unit 111a of the first imaging module 11a may be shorter than a focal length of the second imaging unit 111b of the second imaging module 11b. The first imaging unit 111a and the second imaging unit 111b may be collectively referred to as an imaging unit 111.

The first imaging unit 111a may include a wide-angle lens to function as a wide-angle imaging module. The second imaging unit 111b may include a telephoto lens for functioning as a telephoto imaging module. The imaging apparatus 10 captures a subject using the first imaging unit 111a for wide-angle imaging when a zoom magnification is equal to or greater than 1.0× and is equal to or less than 2.0× (i.e., between 1.0 times the original capture and 2.0 times the original capture inclusive). . Further, when the zoom magnification is greater than 2.0× times and equal to or less than 4.0× (i.e., between 2.1 times the original capture and 4.0 times the original capture inclusive), the imaging apparatus 10 captures the subject using the second imaging unit 111b for telephoto imaging. In the imaging apparatus 10 according to the embodiment, the subject is captured by appropriately dividing the wide-angle lens (the first imaging module 11a) and the telephoto lens (the second imaging module 11b) according to the zoom magnification. The zoom magnification may be operated by the user.

The image replacement unit 12 may replace a first captured image captured by the first imaging module 11a with a second captured image captured by the second imaging module 11b by the zoom magnification operated by a user and may output the replaced image as an output image.

The image replacement unit 12 uses the first imaging module 11a for wide-angle imaging and outputs a first imaging image digitally zoomed at a certain magnification as an output image when the zoom magnification is, for example, equal to or greater than 1.0× and equal to or less than 2.0×. Furthermore, the image replacement unit 12 uses the second imaging module 11b for wide-angle imaging and outputs a second imaging image digitally zoomed at a certain magnification as an output image when the zoom magnification is, for example, equal to or greater than 2.1× and equal to or less than 4.0×.

The parameter storage 13 may include the parameter storage 13a and the parameter storage 13b. The parameter storage 13 may store a block statistics image (a block statistics S), a white balance gain $W_g$, a parameter for color reproduction correction, and a parameter for image signal processing such as a gamma correction table of the imaging module 11. The parameter storage 13 may also be referred to as an image signal processing parameter storage.

The gain acquisition unit 113 acquires image information of a captured image captured by each of a plurality of imaging units 111. That is, the gain acquisition unit 113a acquires image information of a first captured image captured by the first imaging unit 111a. The gain acquisition unit 113b acquires image information of a second captured image captured by the second imaging unit 111b. Specific processing of the gain acquisition unit 113 will be described below.

The image information acquired by the gain acquisition unit 113 is, for example, the white balance gain $W_g$ of the captured image. That is, the gain acquisition unit 113 acquires the white balance gain $W_g$ based on the color type of a captured image captured by each of the plurality of imaging units 111.

The gain acquisition unit 113a and the gain acquisition unit 113b may be collectively referred to as the gain acquisition unit 113. The gain acquisition unit 113a may be referred to as a first acquisition unit, and the gain acquisition unit 113b may be referred to as a second acquisition unit. A gain acquisition unit may be referred to as an acquisition unit.

When a processor 114 replaces the first captured image captured by the first imaging unit 111a from among the plurality of imaging units 111 with the second captured image captured by the second imaging unit 111b from among the plurality of imaging units 111 and outputs the second captured image, the processor 114 may control replacement of the first capture image with the second captured image such that a difference D between first output image information of the first captured image and second output image information of the second captured image is equal to or less than a certain value $D_{th}$. When the processor 17 replaces the first captured image with the second captured image and outputs the second captured image, the processor 17 may correct the image information of the second captured image such that the difference D between the first output image information and the second output image information is equal to or less than a certain value $D_{th}$.

The first output image information may be, for example, a color balance $C_{ba}$ of the first captured image captured by the first imaging unit 111a. The second output image information may be, for example, a color balance $C_{bb}$ of the second captured image captured by the second imaging unit 111b.

When is completely replaced by and the second imaging module 11b is activated, the processor 114b may refer to a correction parameter of the first imaging module 11a stored in the parameter storage unit 13a before actively replacing the first imaging module 11a with the second imaging module 11b. Next, when the imaging module 11 is replaced, the processor 114b may process the image captured by the second imaging module 11b such that a color of the output image (second captured image) after replacement approximates a color of the output image (first captured image) before replacement. The processor 17 corrects the image information of the second captured image such that the difference D between the first output image information and the second output image information is a certain value or less and applies the corrected image information to output the second captured image, thereby reducing the deviation when the captured images are switched.

The processor 114 controls the difference D between the first output image information and the second output image information of the second captured image to be equal to or less than the certain value $D_{th}$, thereby reducing the deviation of an output image when an imaging module is replaced. The processor 114a and the processor 114b are collectively referred to as the processor 114.

In addition, the processor 114 may be provided outside the imaging module 11. In this case, the processor 114 refers to a correction parameter of the first imaging module 11a stored in the parameter storage unit 13a before being actively replaced, and when the imaging module 11 is replaced, processes the image captured by the second imaging module 11b such that the color of an output image after replacement approximates the color of an output image before replacement.

Furthermore, when the first captured image is output, the processor 114 turns off the power of the second imaging module 11b. In addition, when the second captured image is output, the processor 114 turns off the power of the first imaging module 11a.

Accordingly, power consumption of the imaging apparatus 10 may be reduced by the processor 114 turning off the power of an imaging module on an inactive side.

According to another embodiment, instead of turning off the power, the processor 114 may reduce or stop power supplied to a portion in the imaging module on the inactive side to be in a rest state.

The image display 14 may display a captured image captured by either the first imaging module 11a or the second imaging module 11b, which is activated and the captured image is actively converted, as an output image.

The image storage 15 stores the captured image captured by the imaging module of either the first imaging module 11a or the second imaging module 11b, which is activated.

According to an embodiment, the imaging apparatus 10, when an imaging module having different spectral sensitivity is replaced, controls the color of an output image captured by using an imaging module after replacement so as to approximate the color of an output image captured by using an imaging module before replacement.

According to an embodiment, the imaging apparatus 10, when an imaging module having different spectral sensitivity is replaced, adjusts the color of an output image captured by using an imaging module after replacement so as to approximate the color of an output image captured by using an imaging module before replacement.

Therefore, an imaging apparatus, an imaging method, and a recording medium capable of reducing the deviation of an output image when imaging modules with different spectral sensitivities are replaced with each other may be provided. As a result, the imaging apparatus may seamlessly transition between the image captured by the first imaging module 11a and the second imaging module 11b such that a user would be unable to visually notice any deviation in the output image during the transition, and thus the user may not sense discomfort during the transition between the image captured by the first imaging module 11a and the second imaging module 11b.

Furthermore, according to an embodiment, power consumption of the imaging apparatus 10 may be reduced by the imaging apparatus 10 turning power of an imaging module on the inactive side off or being in a rest state.

An imaging module according to an embodiment will be described.

The first imaging module 11a, which is one of the plurality of imaging modules 11, will be described. Since imaging modules other than the first imaging module 11a are also the same, description thereof will be omitted.

Figure 2:
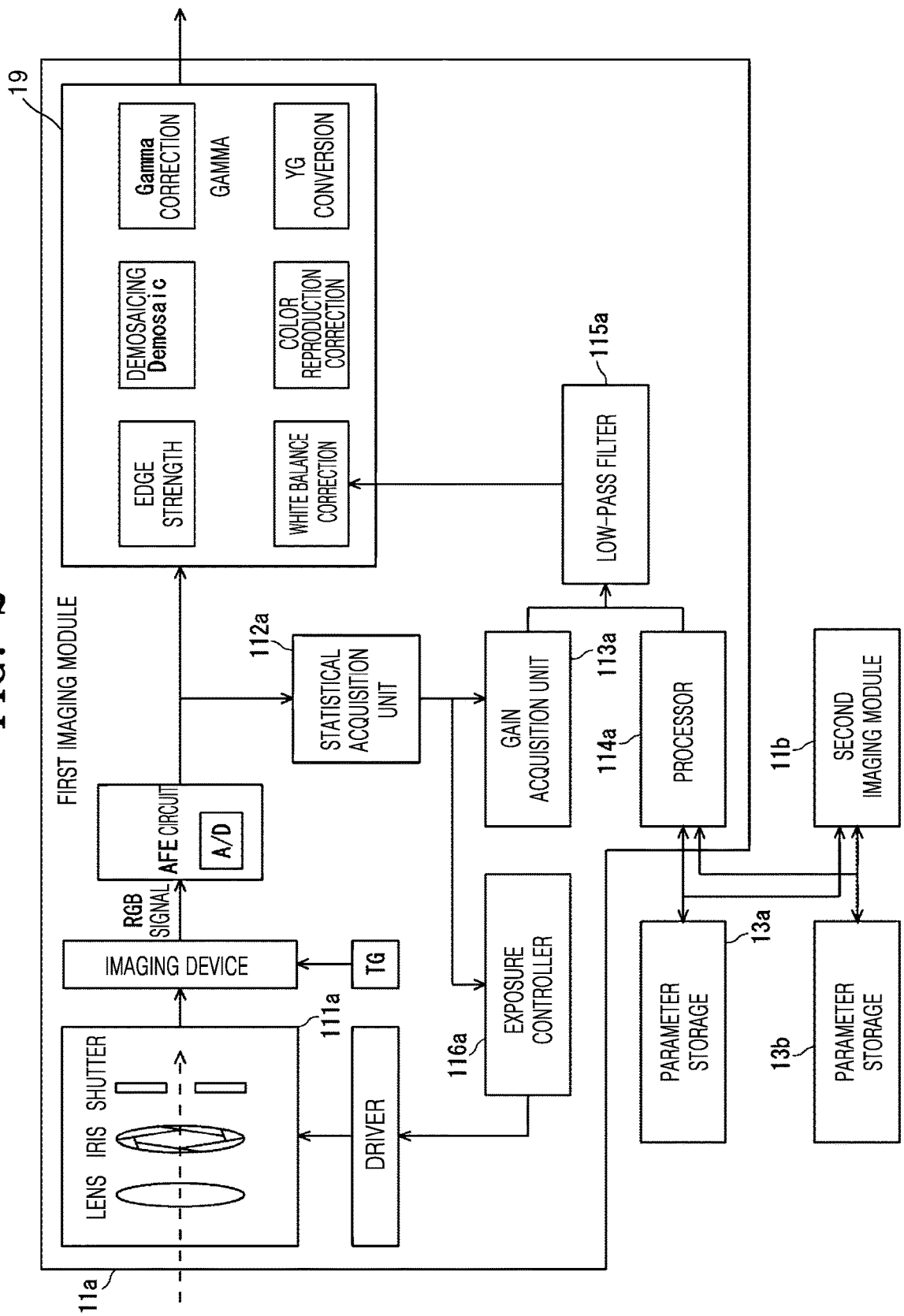
FIG. 2 is a block diagram of an imaging module according to an embodiment.
Figure 3:
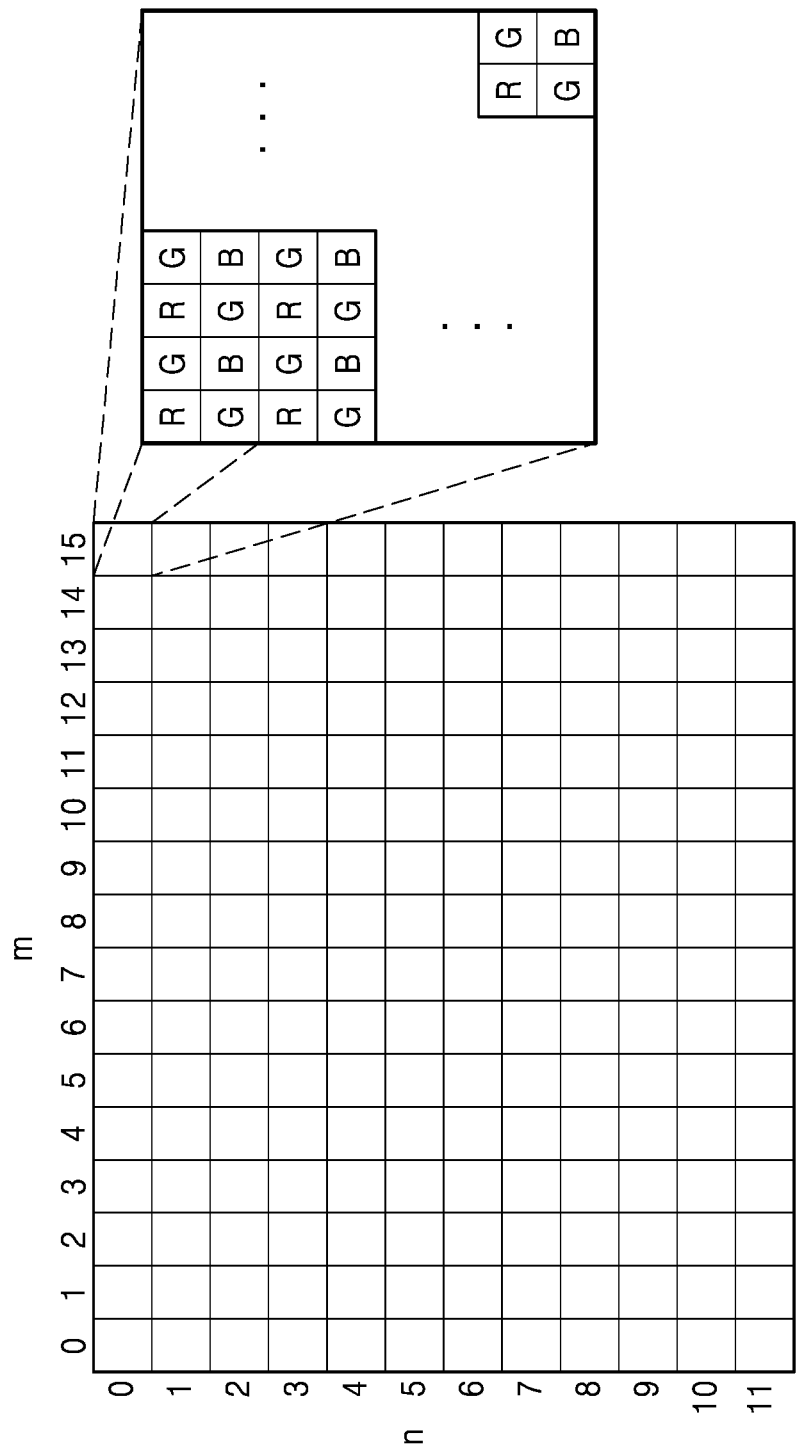
FIG. 3 is a diagram of block division of an image according to an embodiment.

FIG. 2 is a block diagram of an imaging module according to an embodiment and FIG. 3 is a diagram of block division of an image according to an embodiment.

In FIG. 2, connection with the image replacement unit 12, connection with the image display 14, and connection with the image storage 15 are omitted for the sake of simplicity.

As shown in FIG. 2, the first imaging module 11a may further include an imaging apparatus, an analog front end (AFE) circuit, an image signal processing circuit, a driver, and a timing generator (TG) in addition to the first imaging unit 111a, the statistics acquisition unit 112a, the gain acquisition unit 113a, the processor 114a, the low-pass filter 115a, and the exposure controller 116a. The first imaging unit 111a may include a lens, an iris, and a shutter.

An RGB (red, green, blue) color signal output from an imaging device of the first imaging module 11a is subjected to signal processing by a correlated double sampling (CDS) circuit (not shown). An RGB signal after the signal processing is analog/digital (A/D) converted in the AFE circuit. A pre-process such as defective pixel correction and black level correction is performed on an image signal obtained after the A/D conversion According to an embodiment, an image signal processing circuit 19 may perform a plurality of electronic processes such as white balance correction, Bayer color correction, color reproduction correction, edge strength correction, demosaicing, color reproduction correction, YG correction and gamma correction, and the processing image (image information) is stored.

In general, the difference in color occurs depending on an illumination light source between a captured image observed with a naked eye and a captured image captured using an imaging apparatus. The white balance correction of the image signal processing circuit shown in FIG. 2 is a process for causing a white subject to be reproduced in white. For example, natural light such as sunlight and artificial light such as a fluorescent lamp have different color temperatures of both light sources. Therefore, white reproducibility of the captured image is greatly influenced. The white balance correction is intended to prevent incongruity in the reproduced captured mage.

Also, according to an embodiment, the gain acquisition unit 113 may be referred to as a first white balance acquisition unit, and the processor 114 may be referred to as a second white balance acquisition unit. Further, a statistical acquisition unit 112 may be referred to as an image block statistics circuit, and the low-pass filter 115 may be referred to as a white balance low-pass filter.

The statistics acquisition unit 112 divides a captured image captured by each of the plurality of imaging units 111 into a plurality of blocks. As shown in FIG. 3, for example, the statistics acquisition unit 112 divides an image area of the captured image into blocks of n in a vertical direction and m in a horizontal direction. However, n and m are natural numbers. Each of the divided blocks includes a plurality of RGB pixels.

The statistics acquisition unit 112 statistically processes a plurality of RGB pixel values for each of the divided blocks to acquire the block statistics S. The statistical processing is, for example, a process of integrating the plurality of RGB pixel values to acquire an integrated value, or averaging the plurality of RGB pixel values to acquire an average value.

The statistics acquisition unit 112 stores the acquired block statistics S in the parameter storage 13. The block statistics is also referred to as image block statistics. The statistics acquisition unit 112a and the statistics acquisition unit 112b may collectively be referred to as the statistics acquisition unit 112.

Meanwhile, the gain acquisition unit 113 acquires image information based on the acquired block statistics S. The image information is, for example, the white balance gain $W_g$ of a captured image.

According to an embodiment, when an image replacement unit 12 replaces the first captured image with the second captured image and outputs the second captured image, the processor 114 makes the amount of change U from first output image information to second output image information at a certain time $T_h$ be equal to or less than a certain amount of change $U_h$.

Accordingly to an embodiment, the low-pass filter 115 may smoothly change the output image when the imaging module 11 is replaced by controlling the amount of change U from the first output image information to the second output image information at the certain time $T_h$ to be equal to or less than the certain amount of change $U_h$. When the imaging module 11 is replaced, the low-pass filter 115 may smoothly change the output image by correcting a correction parameter of the second output image such that the amount of change U from the first output image information to the second output image information at the certain time $T_h$ is equal to or less than the certain amount of change $U_h$.

The white balance gain $W_g$ is acquired by referring to the block statistics S and subject brightness $B_v$ and by judging whether the captured image is to be achromatic or chromatic. A method of acquiring the white balance gain $W_g$ thus acquired is referred to as a white balance acquisition method. The subject brightness $B_v$ is acquired from exposure control information, a shutter speed, and a sensor sensitivity acquired by the exposure controller 116a.

An exposure controller 116 controls an iris (exposure control information), a shutter speed, and an analog gain of the imaging unit 111 to determine (control) exposure of input image information Rd. The exposure controller 116a and the exposure controller 116b may be collectively referred to as the exposure controller 116.

The imaging module 11 performs white balance correction or exposure control according to the block statistics S acquired by the statistics acquisition unit 112.

Hereinafter, operations of the imaging apparatus 10 according to an embodiment will be described.

In the disclosure, for the sake of simplicity, it is assumed that the first imaging module 11a is a wide-angle imaging module and the second imaging module 11b is a telephoto imaging module, and a case of replacing the first imaging module 11a with the second imaging module 11b will be described. However, the embodiment is not limited thereto, and the following description may be applied even when the second imaging module 11b is replaced with the first imaging module 11a.

Figure 4A:
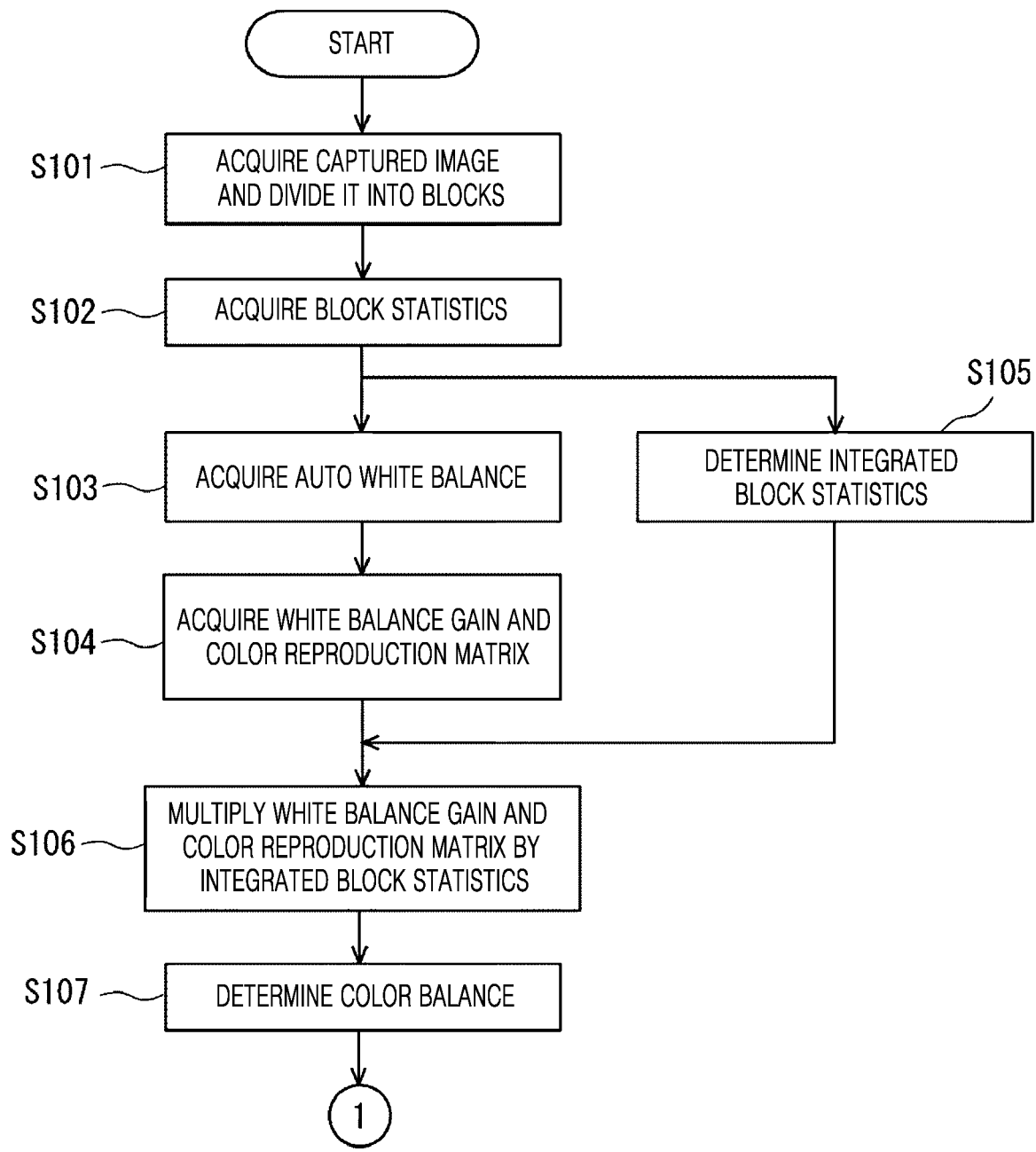
FIG. 4A is a flowchart of image processing according to an embodiment.

FIG. 4A is a flowchart of image processing according to an embodiment. For example, FIG. 4A is a flowchart illustrating image processing of a captured image captured by a wide-angle imaging module.

Figure 4B:
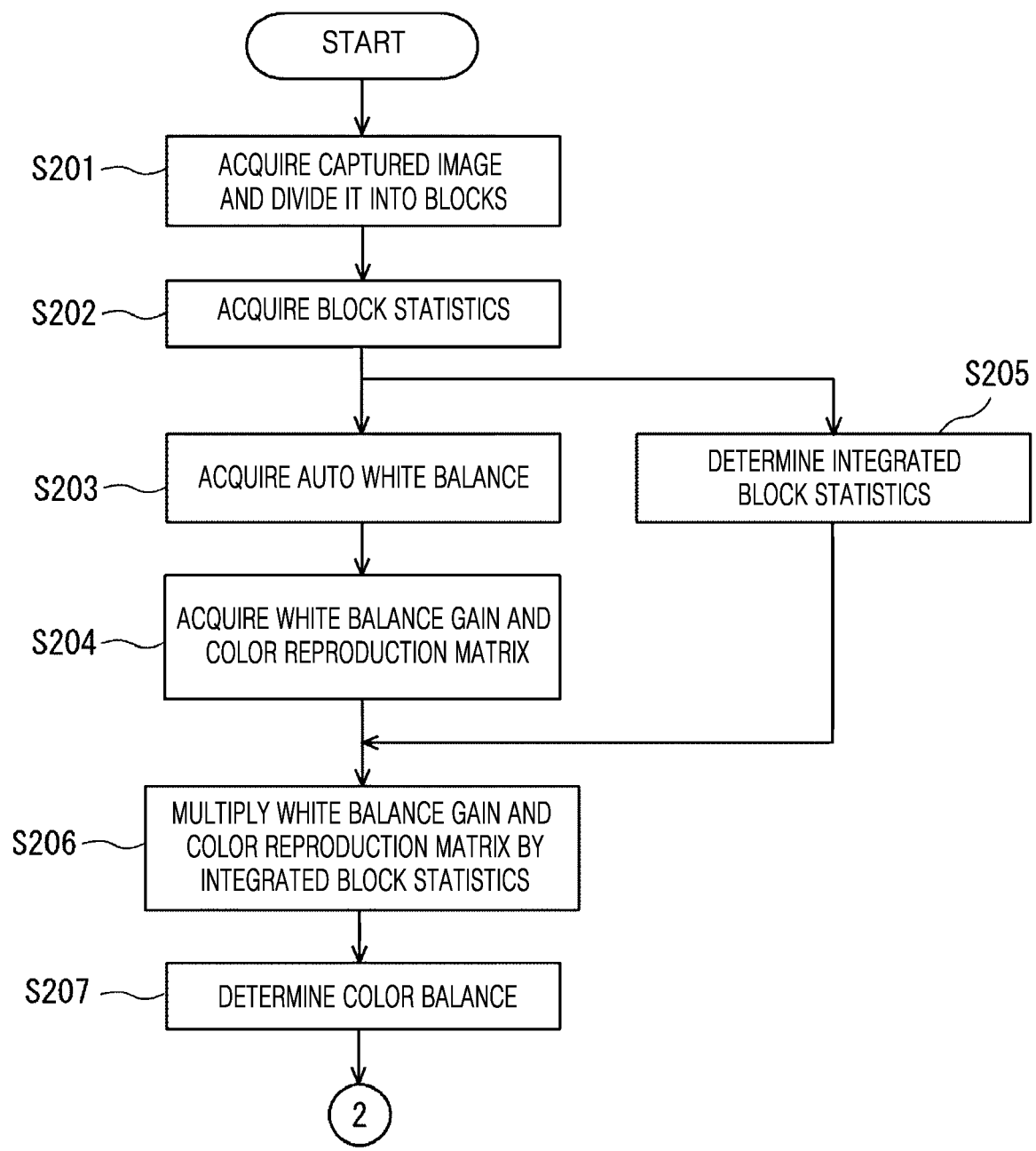
FIG. 4B is a flowchart of image processing according to an embodiment.

FIG. 4B is a flowchart of image processing according to an embodiment. For example, FIG. 4B is a flowchart illustrating image processing of a captured image captured by a telephoto imaging module.

Figure 4C:
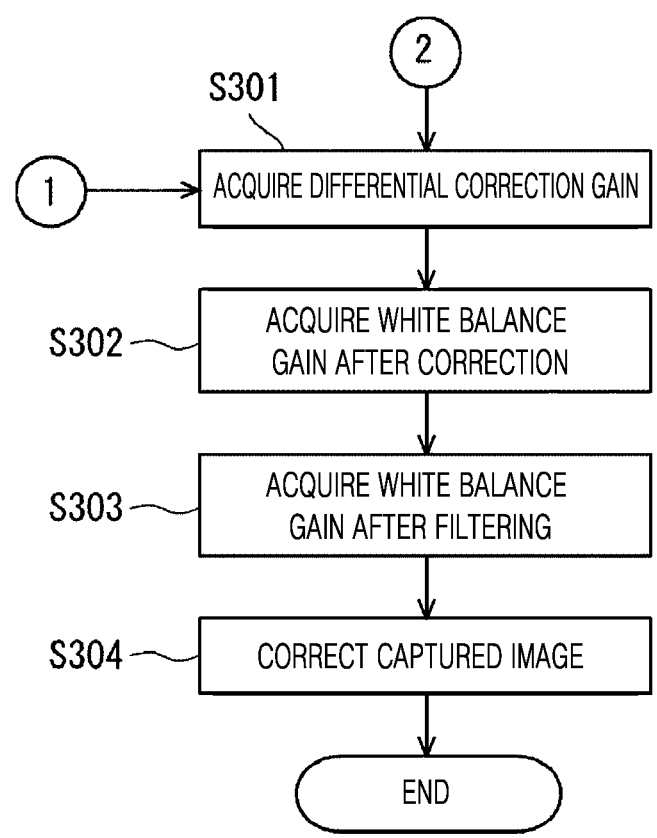
FIG. 4C is a flowchart of image processing according to an embodiment.

FIG. 4C is a flowchart of image processing according to an embodiment.

Figure 5A:
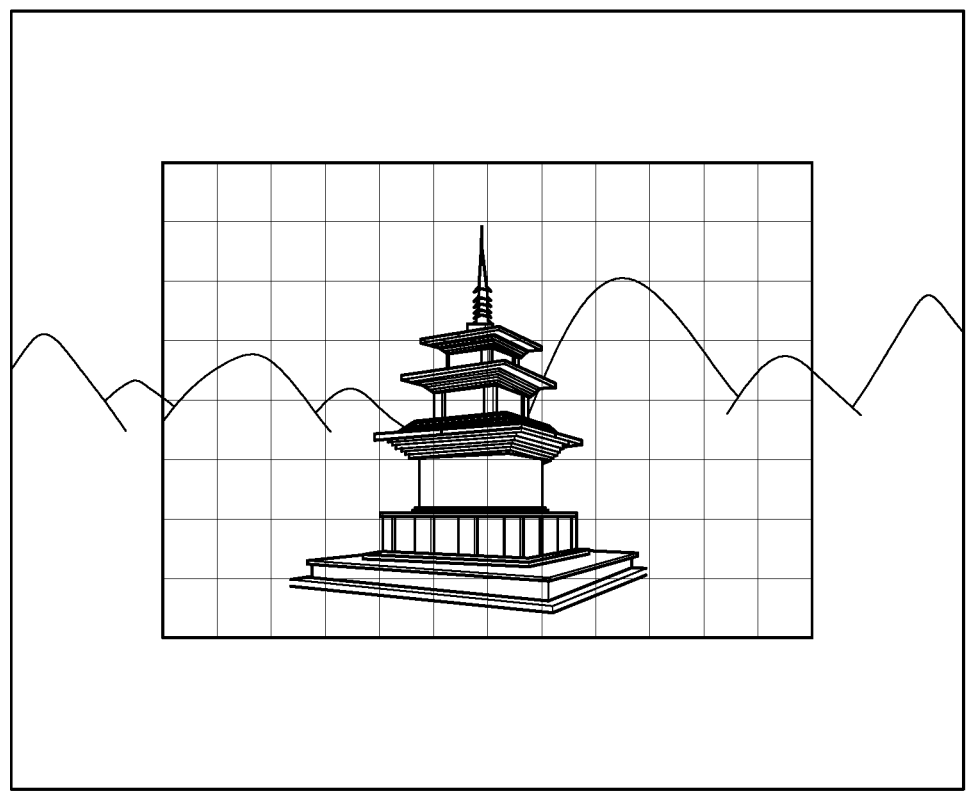
FIG. 5A is an example of an image captured using an imaging module according to an embodiment.

As shown in FIG. 4A, the first imaging module 11a acquires a captured image before the replacement unit 12 replaces the first imaging module 11a with another imaging module such as a second imaging module 11b. As shown in FIG. 5A, in operation S101, the captured image acquired by the first imaging module 11a is divided into blocks. The first imaging module 11a may be a wide-angle imaging module, and FIG. 5A is an example of a captured image captured using the wide-angle imaging module.

The first imaging module 11a acquires block statistics $S_a$, before the replacement, and stores the block statistics $S_a$ in the parameter storage 13a.

In operation S102, the processor 114a acquires the block statistics $S_a$ of the first imaging module 11a stored in the parameter storage 13a. According to an embodiment, the processor 114a maybe a second white balance acquisition unit.

In operation S103, auto white balance $A_{wa}$ is determined from the block statistics $S_a$.

In operation S104, the gain acquisition unit 113a of the first imaging module 11a acquires a white balance gain $W_{ga}$ according to the block statistics $S_a$ and subject brightness $B_{va}$. In operation S104, the gain acquisition unit 113a acquires color reproduction matrix $C_{ma}$. According to an embodiment, the gain acquisition unit 113a maybe the first white balance acquisition unit.

Furthermore, the white balance gain is also referred to as a first white balance gain.

In operation S105, the processor 114a integrates the block statistics $S_a$ and acquires integrated block statistics $S_{sa}$. According to an embodiment, the integrated block statistics $S_{sa}$ may be determined by averaging the plurality of RGB pixel values to acquire an average value.

In operation S106, the white balance gain $W_{ga}$ and the color reproduction matrix $C_{ma}$ are multiplied by the integrated block statistics $S_{sa}$ of the first imaging module 11a.

In operation S107, determine, as a result of the multiplication in operation S106, the color balance $C_{ba}$ of the entire captured image. The color balance $C_{ba}$ of the first captured image captured by the first imaging unit 111a of the first imaging module 11a is also referred to as first output image information.

Furthermore, the processing from operation S102 to operation S107 may be performed every frame in the active imaging module 11 and the result may be stored in the parameter storage 13. The processing from operation S102 to operation S107 may be performed only once immediately after the imaging module 11 after replacement is activated. The activation is also referred to as driving.

Figure 5B:
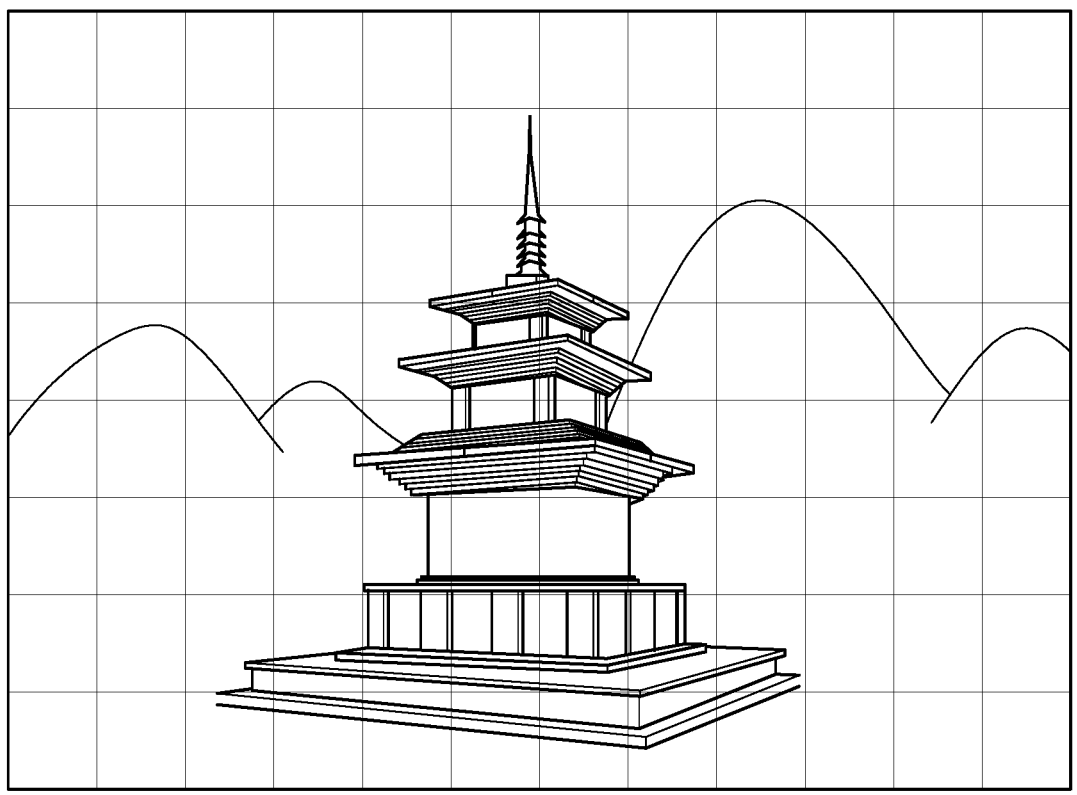
FIG. 5B is an example of an image captured using an imaging module according to an embodiment.

Meanwhile, the second imaging module 11b acquires, after the replacement, the color balance $C_{bb}$ of the entire captured image as in operations S201 to S207 shown in FIG. 4B, similarly to the first imaging module 11a before replacement. A second imaging module 12a may be a telephoto imaging module, and FIG. 5B is an example of an image captured using the telephoto imaging module.

The second imaging module 11b multiplies the white balance gain $W_{gb}$ and the color reproduction matrix $C_{mb}$ of the second imaging module 11b by the integrated block statistics $S_{sb}$ obtained by integrating the block statistics $S_b$, and acquires the color balance $C_{bb}$ of the entire captured image. The color balance $C_{bb}$ of the second captured image captured by the second imaging unit 111b of the second imaging module 11b is also referred to as second output image information.

Subsequently, as shown in FIG. 4C, in operation S301, a differential correction gain coefficient $G_{dc}$, in which the color balance $C_{bb}$ of the entire captured image after replacement coincides with the color balance $C_{ba}$ of the entire captured image before replacement, is determined.

The differential correction gain coefficient $G_{dc}$ may be determined by dividing the color balance $C_{ba}$ of the entire captured image before replacement by the color balance $C_{bb}$ of the entire captured image after replacement.

The differential correction gain coefficient $G_{dc}$ may be denoted as Equation 1.

$$Gdc = Cba/Cbb \quad \text{[Equation 1]}$$

In operation S302 after operation S301, white balance gain $W_{cgb}$ after correction is determined by multiplying the white balance gain $W_{gb}$ of the second imaging module 11b after replacement by the differential correction gain coefficient $G_{dc}$. Normalization may be performed such that the minimum of each white balance gain $W_g$ of RGB is 1.0.

The white balance gain $W_{gb}$ of the second imaging module 11b before correction may be referred to as a first white balance gain. The white balance gain $W_{cgb}$ after correction is also referred to as a second white balance gain.

The white balance gain $W_{cgb}$ after correction of the second imaging module 11b after replacement may be denoted as Equation 2.

$$Wcgb = Wgb \times Gdc \quad \text{[Equation 2]}$$

In operation S303 after operation S302, white balance gain $W_{cgb}$ after filtering for setting a white balance correction unit of the image signal processing circuit (see FIG. 2) is acquired using the low-pass filter 115b of the second imaging module 11b after replacement.

In more detail, the low-pass filter 115b of the second imaging module 11b acquires the white balance gain $W_{cgb}$ after filtering for smoothly changing from the white balance gain $W_{cgb}$ after correction to the white balance gain $W_{gb}$ at the certain time $T_h$. The certain time $T_h$ is, for example, 30 frames.

The white balance gain $W_{cgb}$ after correction of the second imaging module 11b may be denoted by LPF ($W_{gb}$, $W_{cgb}$) as Equation 3.

$$Wfgb = LPF(Wgb, Wcgb) \quad \text{[Equation 3]}$$

LPF ($W_{gb}$, $W_{cgb}$) is a function using the white balance gain $W_{gb}$ of the second imaging module 11b before correction and the white balance gain $W_{cgb}$ after correction of the second imaging module 11b as parameters.

In operation S304 after operation S303, the image signal processing circuit 19 including a white balance correction of the second imaging module 11b corrects a captured image based on the white balance gain $W_{fgb}$ after filtering.

Thus, at the time of replacement of the imaging module 11, the color deviation of an output image may be reduced, and color of the output image may be smoothly and progressively changed in time series.

Meanwhile, in an imaging apparatus according to another embodiment, image information acquired by the gain acquisition unit 113 is, for example, brightness $B_d$ of a captured image. First output image information of a first captured image captured by the first imaging unit 111a is brightness $B_{da}$ of the first captured image captured by the first imaging unit 111a. Second output image information of a second captured image captured by the second imaging unit 111b is brightness $B_{ab}$ of the second captured image captured by the second imaging unit 111b.

An imaging apparatus according to an embodiment may adjust a digital gain $D_g$ such that the brightness $B_d$ of an output image captured using the imaging module 11 before replacement coincides with the brightness $B_d$ of an output image at the time of replacement. Therefore, the imaging apparatus according to the embodiment may reduce brightness deviation at the time of replacement of a captured image. Brightness is also referred to as a G level signal or a G signal.

In an imaging apparatus according to an embodiment, a captured image captured by the imaging module 11 is input as the input image information $R_d$, subjected to various gain processing, and output as an output image. Output image information $P_d$ of the imaging module 11 is obtained by multiplying the input image information $R_d$, the white balance gain $W_g$, the digital gain $D_g$, color reproduction matrix $C_m$, and gamma correction coefficient γ.

The output image information $P_d$ of the imaging module 11 may be denoted as Equation 4.

$$Pd = Rd \times Wg \times Dg \times Cm \times \gamma \qquad [\text{Equation 4}]$$

An exposure controller 116 controls a shutter speed, an iris, and an analog gain to determine exposure of a captured input image. In an imaging apparatus according to an embodiment, the brightness $B_d$ is controlled (adjusted) by the digital gain $D_d$. The input image information may also be referred to as RAW data.

In more detail, the imaging apparatus 10 adjusts the digital gain $D_d$ such that an integrated value of brightness (G signal) of an output image of the first imaging module 11a before replacement coincides with an integrated value of the brightness (G signal) of an output image of the second imaging module 11b after replacement.

When the digital gain $D_d$ is 1.0 or less, there is a problem in that a high luminance pixel becomes pink. In order to set the digital gain $D_d$ to a value greater than 1.0, the exposure controller 116b of the second imaging module 11b after replacement is controlled to expose with underexposure and brightness (a G signal integrated value) is controlled using the digital gain $D_d$ so as to coincide with the brightness of the first imaging module 11a before replacement. Underexposure is, for example, −0.3 EV.

Thereafter, a control value of the exposure controller 116b of the second imaging module 11b after replacement is adjusted over several frames until normal exposure is obtained from the underexposure and the digital gain Dg is also controlled to be 1.0 over several frames.

By controlling in this way by the imaging apparatus according to an embodiment, it is possible to reduce brightness deviation of an output image at the time of replacement of the imaging module 11. As a result, the disclosure may provide an imaging apparatus, an imaging method, and a recording medium capable of reducing the deviation of an output image when imaging modules with different spectral sensitivities are replaced with each other.

Furthermore, the imaging apparatus 10 may set the digital gain $D_d$ to 1.0 except when the imaging module 11 is replaced (normally) and may use the digital gain $D_d$ set to 1.0 at the time of replacement of the imaging module 11.

The above-described embodiment has described the disclosure as a hardware configuration. However, the disclosure is not limited thereto. The disclosure may also be executed by, for example, software on a personal computer (PC). The disclosure may also be realized by executing a computer program in a central processing unit (CPU) of a PC, for example, for processing each component. The computer program may be stored and supplied to a computer using various types of non-transitory computer readable media. The non-transitory computer readable media include, for example, a magnetic recording medium, a magneto-optical recording medium, CD-ROM (read only memory), and a semiconductor memory. In addition, the computer program may be supplied by the non-transitory computer readable media, or may be supplied via a wired communication path or a wireless communication path.

Furthermore, the disclosed embodiments may be implemented in a software (S/W) program that includes instructions stored on a computer-readable storage medium.

The computer may include an image transmitting apparatus and an image receiving apparatus according to the disclosed embodiments, which is a device capable of calling stored instructions from a storage medium and operating according to the disclosed embodiments according to the called instructions.

The computer-readable storage medium may be provided in the form of a non-transitory storage medium. Here, the term 'non-transitory' means that a storage medium does not include a signal and is tangible, and does not distinguish whether data is stored in the storage medium semi-permanently or temporarily.

Also, the embodiments may be provided by being included in a computer program product. The computer program product is a product that may be traded between a seller and a purchaser.

The computer program product may include a software program and a computer-readable storage medium having recorded thereon the software program. For example, the computer program product may include a product (for example, a downloadable application) in a form of a software program electronically distributed through an electronic market (for example, Google Play or Appstore) or a manufacturer of a patient monitoring apparatus. For electronic distribution, at least a part of the software program may be stored in a storage medium or may be temporarily generated. In this case, the storage medium may be a storage medium of a server of the manufacturer, a server of the electronic market, or a relay server that temporarily stores the software program.

The computer program product may include a storage medium of a server or a storage medium of a terminal in a system composed of a server and a terminal (e.g., the image transmitting apparatus or the image receiving apparatus). Alternatively, when there is a third device (e.g., a smartphone) in communication with the server or terminal, the computer program product may include a storage medium of the third device. Alternatively, the computer program product may include the S/W program itself transmitted from the server to the terminal or the third device, or transmitted from the third device to the terminal.

In this case, one of the server, the terminal, and the third device may execute the computer program product to perform methods according to the disclosed embodiments. Alternatively, two or more of the server, the terminal and the third device may execute the computer program product to distribute the methods according to the disclosed embodiments.

For example, the server (e.g., a cloud server or an artificial intelligence server, etc.) may execute a computer program product stored on the server to control the terminal in communication with the server to perform the methods according to the disclosed embodiments.

As another example, a third device may execute a computer program product to control a terminal in communication with to a third device to perform a method according to the disclosed embodiment. As a specific example, the third device may remotely control an imaging apparatus to acquire or output a captured image.

When the third device executes the computer program product, the third device may download the computer program product from the server and execute the downloaded computer program product. Alternatively, the third device may execute a computer program product provided in a preloaded manner to perform methods according to the disclosed embodiments.

The disclosure may provide an imaging apparatus, an imaging method, and a recording medium capable of reducing the deviation of an output image when imaging modules with different spectral sensitivities are replaced with each other.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An imaging apparatus comprising:
    a first imaging sensor configured to capture a first image of a subject;
    a second imaging sensor configured to capture a second image of the subject; and
    at least one processor configured to:
        selectively obtain one of the first image or the second image to be output as an output image based on a magnification characteristic of the output image;
        based on the first image being replaced with the second image as the output image, correct image information of the second image based on first output image information of the first image and second output image information of the second image; and
        output the output image based on a correction to the second image based on the corrected image information of the second image,
        wherein the image information of the second image is a white balance gain obtained from the second image, and
        wherein the at least one processor is further configured to:
            obtain a filtered white balance gain by applying a low-pass filter to the image information of the second image and the corrected image information of the second image; and
            output the output image based on the filtered white balance gain.

2. The imaging apparatus of claim 1, wherein the at least one processor is further configured to correct the image information of the second image so that a difference between a first value corresponding to the first output image information and a second value corresponding to the second output image information is equal to or less than a certain value.

3. The imaging apparatus of claim 1, wherein
    the first output image information is a color balance of the first image, and
    the second output image information is a color balance of the second image.

4. The imaging apparatus of claim 3, wherein the at least one processor is further configured to:
    determine the first output image information based on a first white balance gain obtained from the first image and
    determine the second output image information based on a second white balance gain obtained from the second image;
    determine a third white balance gain by correcting the second white balance gain based on the first output image information and the second output image information;
    determine a fourth white balance gain, which is the filtered white balance gain, by applying the low-pass filter to the second white balance gain and the third white balance gain; and
    output the output image based on the fourth white balance gain.

5. The imaging apparatus of claim 1, wherein the at least one processor is further configured to divide each of the first image and the second image into a plurality of blocks and respectively determine the first output image information and the second output image information based on an integrated value or an average value of RGB pixel values included in each of the plurality of blocks.

6. The imaging apparatus of claim 1, wherein the first output image information is obtained by a first processor,
    wherein the first imaging sensor and the first processor are included in a first imaging module,
    wherein the second output image information is obtained by a second processor,
    wherein the second imaging sensor and the second processor are included in a second imaging module,
    wherein the at least one processor is further configured to turn off the power of the second imaging module when the first image is output as the output image, and
    turn off the power of the first imaging module when the second image is output as the output image.

7. The imaging apparatus of claim 1, further comprising:
    the low-pass filter configured to obtain the filtered white balance gain so that, an amount of change from the first output image information to the second output image information at a certain time is equal to or less than a certain amount of change.

8. The imaging apparatus of claim 1, wherein the first imaging sensor and the second imaging sensor have different focal lengths and spectral sensitivities.

9. An imaging method comprising:
    capturing a first image of a subject by a first imaging sensor;
    capturing a second image of the subject by a second imaging sensor;
    selectively obtaining, by at least one processor, one of the first image and the second image to be output as an output image based on a magnification characteristic of the output image;
    based on the first image being replaced with the second image as the output image, correcting image information of the second image based on first output image information of the first image and second output image information of the second image and obtaining a filtered white balance gain by applying a low-pass filter to the image information of the second image and the corrected image information of the second image; and outputting the output image based on a correction to the second image based on the corrected image information of the second image, wherein the image information of the second image is a white balance gain obtained from the second image, and wherein the outputting of the output image comprises:
outputting the output image based on the filtered white balance gain.

10. The imaging method of claim 9, further comprising:
correcting the image information of the second image so that a difference between a first value corresponding to the first output image information and a second value corresponding to the second output image information is equal to or less than a certain value.

11. The imaging method of claim 9, wherein the first output image information is a color balance of the first image, and the second output image information is a color balance of the second image.

12. The imaging method of claim 11, further comprising:
determining the first output image information based on a first white balance gain obtained from the first image;
determining the second output image information based on a second white balance gain obtained from the second image;
determining a third white balance gain by correcting the second white balance gain based on the first output image information and the second output image information;
determining a fourth white balance gain, which is the white balance gain, by applying the low-pass filter to the second white balance gain and the third white balance gain; and
outputting the output image based on the fourth white balance gain.

13. The imaging method of claim 9, further comprising:
dividing each of the first image and the second image into a plurality of blocks and respectively determining the first output image information and the second output image information based on an integrated value or an average value of RGB pixel values included in each of the plurality of blocks.

14. The imaging method of claim 9, further comprising:
turning off the power of a second imaging module comprising the second imaging sensor when the first image is output; and
turning off the power of a first imaging module comprising the first imaging sensor when the second image is output.

15. The imaging method of claim 9, wherein the obtaining of the filtered white balance gain comprises:
obtaining the filtered white balance gain so that an amount of change from the first output image information to the second output image information at a certain time is equal to or less than a certain amount of change.

16. The imaging method of claim 9, wherein the first imaging sensor and the second imaging sensor have different focal lengths and spectral sensitivities.

17. A computer program product comprising a non-transitory computer-readable recording medium having recorded thereon a program for executing an imaging method, the imaging method comprising:

capturing a first image of a subject by a first imaging sensor;
capturing a second image of the subject by a second imaging sensor;
selectively obtaining, by at least one processor, one of the first image and the second image to be output as an output image based on a magnification characteristic of the output image;
based on the first image being replaced with the second image as the output image, correcting image information of the second image based on first output image information of the first image and second output image information of the second image and obtaining a filtered white balance gain by applying a low-pass filter to the image information of the second image and the corrected image information of the second image; and
outputting the output image based on a correction to the second image based on the corrected image information of the second image,
wherein the image information of the second image is a white balance gain obtained from the second image, and
wherein the outputting of the output image comprises:
outputting the output image based on the filtered white balance gain.

18. The computer program product of claim 17, further comprising:
dividing each of the first image and the second image into a plurality of blocks and respectively determining the first output image information and the second output image information based on an integrated value or an average value of RGB pixel values included in each of the plurality of blocks,
wherein the first output image information is a color balance of the first image, and
wherein the second output image information is a color balance of the second image.

19. An imaging apparatus comprising:
at least one processor configured to:
selectively obtain one of a first image from a first imaging sensor or a second image from a second imaging sensor as an output image;
obtain an instruction to change a magnification value of the output image;
replace the first image with the second image based on a determination that the magnification value satisfies a certain criteria;
based on the first image being replaced with the second image as the output image, correct image information of the second image based on first output image information of the first image and second output image information of the second image; and
output the output image based on a correction to the second image based on the corrected image information of the second image,
wherein the image information of the second image is a white balance gain obtained from the second image, and
the at least one processor is further configured to:
obtain a filtered white balance gain by applying a low-pass filter to the image information of the second image and the corrected image information of the second image; and
output the output image based on the filtered white balance gain.

20. The imaging apparatus of claim 19, wherein the at least one processor is further configured to:

determine the first output image information based on a first white balance gain obtained from the first image and determine the second output image information based on a second white balance gain obtained from the second image;

determine a third white balance gain by correcting the second white balance gain based on the first output image information and the second output image information;

determine a fourth white balance gain, which is the filtered white balance gain, by applying the low-pass filter to the second white balance gain and the third white balance gain; and output the output image based on the fourth white balance gain.

21. An imaging method comprising:

selectively obtaining one of a first image from a first imaging sensor or a second image from a second imaging sensor as an output image;

obtaining an instruction to change a magnification value of the output image;

replacing the first image with the second image based on a determination that the magnification value satisfies a certain criteria;

based on the first image being replaced with the second image as the output image, correcting image information of the second image based on first output image information of the first image and second output image information of the second image and obtaining a filtered white balance gain by applying a low-pass filter to the image information of the second image and the corrected image information of the second image; and outputting the output image based on a correction to the second image based on the corrected image information of the second image, wherein the image information of the second image is a white balance gain obtained from the second image, and wherein the outputting of the output image comprises:
outputting the output image based on the filtered white balance gain.

22. The imaging method of claim 21, further comprising:

determining the first output image information based on a first white balance gain obtained from the first image;

determining the second output image information based on a second white balance gain obtained from the second image;

determining a third white balance gain by correcting the second white balance gain based on the first output image information and the second output image information;

determining a fourth white balance gain, which is the filtered white balance gain, by applying the low-pass filter to the second white balance gain and the third white balance gain; and outputting the output image based on the fourth white balance gain.

* * * * *